United States Patent [19]

Vaughn

[11] Patent Number: 5,154,349

[45] Date of Patent: Oct. 13, 1992

[54] MAINTENANCE CONTROL APPARATUS FOR LAWN WATERING SYSTEM

[76] Inventor: David H. Vaughn, 121 Stanton St., Northport, N.Y. 11768

[21] Appl. No.: 763,949

[22] Filed: Sep. 23, 1991

[51] Int. Cl.[5] .................... A01G 25/16; G05D 7/06
[52] U.S. Cl. ........................... 239/69; 239/67; 239/70; 137/624.2; 364/420
[58] Field of Search .................... 239/67, 69, 70; 364/420; 137/624.2

[56] References Cited

U.S. PATENT DOCUMENTS

| | | | |
|---|---|---|---|
| 4,760,547 | 7/1988 | Duxbury | 239/69 |
| 4,937,732 | 6/1990 | Brundisini | 239/69 |
| 4,962,522 | 10/1990 | Marian | 239/70 |
| 5,060,859 | 10/1991 | Bancroft | 239/70 |

*Primary Examiner*—Andres Kashnikow
*Assistant Examiner*—Lesley D. Morris
*Attorney, Agent, or Firm*—H. S. Ingham

[57] ABSTRACT

A maintenance control apparatus for a lawn watering system includes an accessible electrical receptacle and a portable switching unit. The unit includes a plug for detachably coupling into the receptacle and a selection switch for selectively supplying power through the receptacle to the solenoid water valves. The valves are thereby selectively openable remotely and independently of the clock controller of the watering system. An auxiliary battery and jack are provided to substitute for the main power. A portable master switch electively supplies power to open or close the master valve.

9 Claims, 2 Drawing Sheets

MAINTENANCE CONTROL APPARATUS FOR LAWN WATERING SYSTEM

This invention relates to lawn watering systems and particularly to an apparatus for controlling the system during maintenance.

BACKGROUND OF THE INVENTION

Permanently installed watering systems typically include a number of lawn sprinklers, with several water conduits feeding water to one or more of the sprinklers in zones. The conduits generally are installed underground, and each one feeds a different zone of sprinklers. A clock control system supplies electrical power to each of the zone valves so as to selectively provide water to the sprinklers. The clock system operates each of the sprinkler zones independently according to selected schedules. The clock system and associated switching controls are generally located inside of the building for protection from the weather and from unauthorized tampering.

Maintenance of the sprinklers is routine. For example, in colder climates this includes draining the conduits and sprinklers of the water to prevent damage by freezing. Entry into the building is ordinarily necessary to actuate the valves, for example so that compressed air may be applied through a manual valve outlet at the manifold to blow out each conduit and associated sprinklers with valves opened individually. It can be inconvenient and sometimes virtually impossible to gain entry to the building to effect such procedures.

Switches, or even the clock controls could be placed outside of the building for maintenance access. However, a lock box would be necessary for security to prevent unauthorized use. The extra switches and the lock box would add significantly to cost. One control system used for areas such as golf courses utilizes radio controls, like garage door openers. This, too, would be too costly for ordinary lawn watering systems, particularly for private homes.

Therefore, objects of the invention are to provide a novel control apparatus for maintenance of a lawn watering system, and to provide such an apparatus for convenient maintenance of the system and at modest cost.

SUMMARY OF THE INVENTION

The foregoing and other objects are achieved for a lawn watering system that includes a multiplicity of sprinklers for dispersing water onto a lawn, a plurality of water conduits receptive of pressurized water with each conduit communicating with at least one of the sprinklers, and a plurality of electrically actuated dedicated valves each being disposed in one of the conduits. The system further includes a plurality of electrical power points each being connected electrically to one of the dedicated valves, and internal control means communicating with an electrical power source for selectively supplying electrical power to the power points and thereby to the dedicated valves so as to selectively provide water to the sprinklers. The power points and the internal control means are disposed in an internal location so as to be generally inaccessible.

According to the invention a maintenance control apparatus comprises an accessibly mounted receptacle and having a plurality of first connectors each being for connecting electrically to one of the power points, and a portable switching system. The switching system comprises coupling means for detachably coupling into the receptacle and having a plurality of second connectors adapted to electrically contact corresponding first connectors, and selective switching means communicating with a power means for selectively supplying electrical power to the second connectors and thereby to the dedicated valves. With the coupling means coupled into the receptacle, the dedicated valves are thereby selectively openable remotely by the switching means independently of the internal control means.

In one aspect of the invention an auxiliary battery and jack are provided for disconnecting the main power source from the switching means and substituting therefor auxiliary power in electrical contact with the switching means. A light may be provided for signaling whether the main power source is deactivated from the watering system.

In another aspect of the invention, the receptacle has an additional first connector for being connected electrically to a master valve for the watering system, and the coupling means has an additional second connector adapted to electrically contact the additional first connector. The switching system further comprises a portable master switch communicating with the power means for electively supplying electrical power to the additional second connector and thereby to the master valve. Upon the coupling means being coupled into the receptacle the master valve is actuatable remotely.

DETAILED DESCRIPTION OF THE INVENTION

Figure 1:
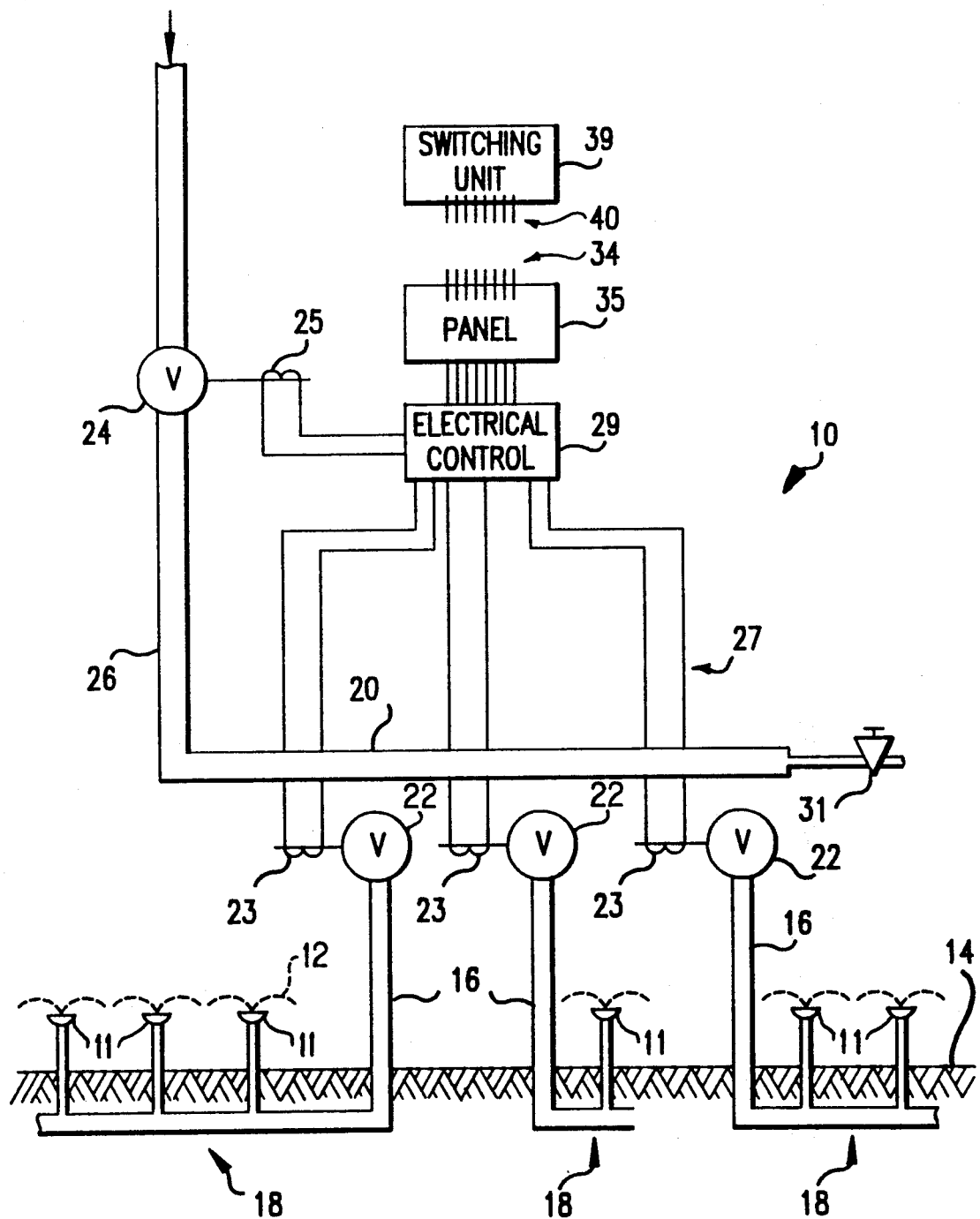
FIG. 1 is a schematic drawing of a lawn watering system incorporating the invention.

The invention is utilized with a generally conventional or desired lawn watering system. Such a system 10 (FIG. 1) includes a multiplicity of sprinklers 11 for dispersing water 12 onto a lawn 14. A plurality of water conduits 16 are receptive of pressurized water with each conduit being attached to one or more of the sprinklers. The conduits generally are installed underground, and each one feeds a different zone 18 of sprinklers.

A water manifold 20 is mounted at a convenient location typically underground. The manifold is connected to distribute the water into each of the conduits 16. A water valve 22 is electrically actuated by a solenoid 23 or the like, and is disposed in each of the conduits. The valves are located conveniently at the place where the conduit joins the manifold, so that there are a plurality of such dedicated valves 22 each controlling a different zone 18. An electrically actuated master flow means, such as a valve 24 with a solenoid 25, and/or a pump (not shown), is disposed at the inlet 26 to the manifold to establish the entire flow on or off. Valves 22,24 are simple on-off and normally should be off unless electrical power is applied. The solenoids have leads 27 from an electrical control system 29. A manual valve 31 off the manifold can receive compressed air.

Figure 2:
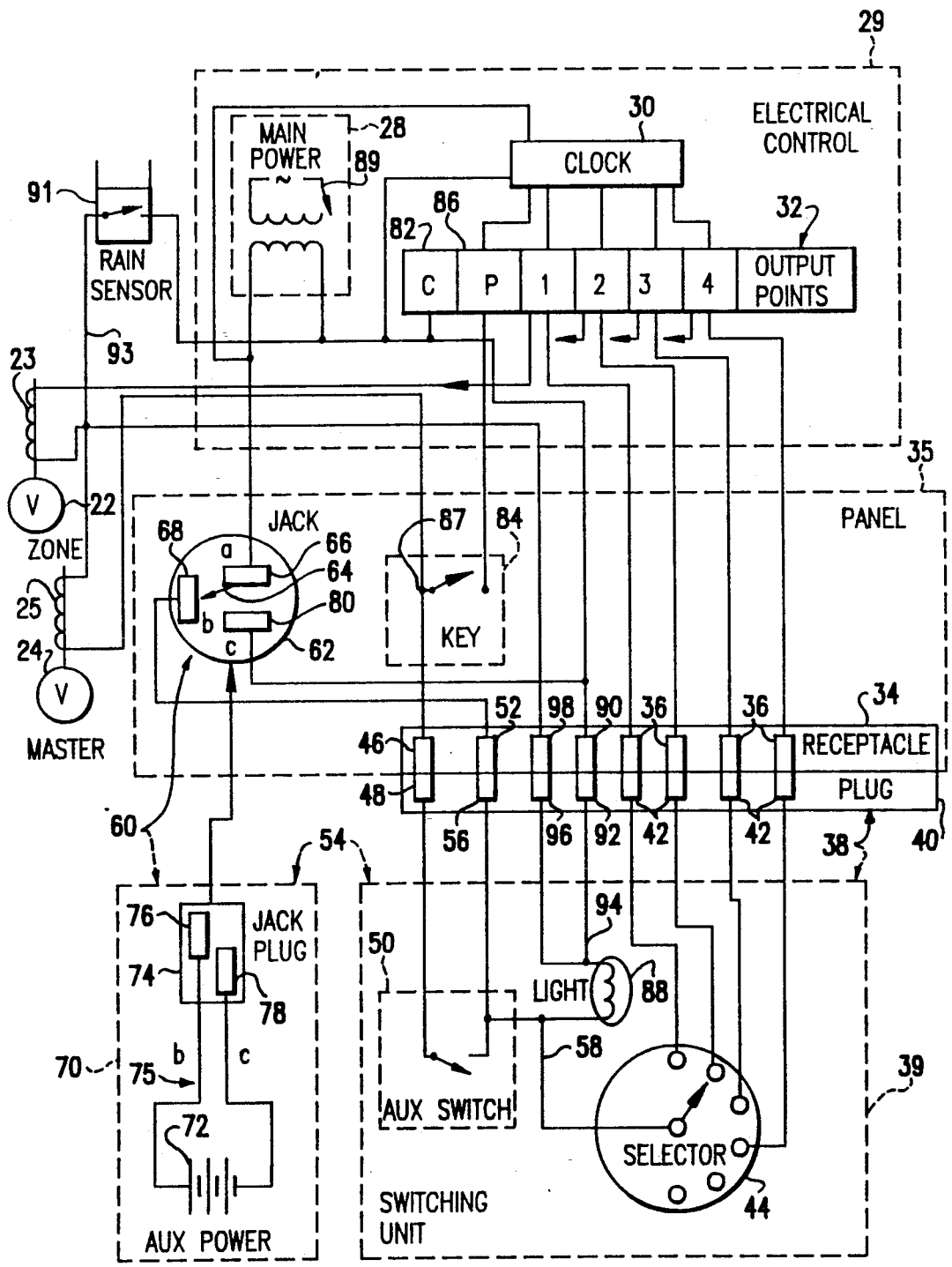
FIG. 2 is an electrical schematic of controls for the system of FIG. 1 including a control apparatus according to the invention.

In the standard electrical portion 29 of the system (FIG. 2), a main power source 28 provides a low voltage to the valves, such as 24 volts stepped down by transformer from line voltage. A clock or other internal control system 30 is connected to the power source for selectively supplying electrical power to each of the zone valves 22 so as to selectively provide water to the sprinklers. System 30 supplies power to the valves 22 by way of a panel of associated electrical power output points 32.

The clock system 30 operates each of the sprinkler zones independently according to selected schedules. This system may comprise a plurality of electrical or mechanical clocks, or a single clock with a plurality of independent contact points, or a digital clock system, or a computer control system, or even a panel of switches for manual control. In any event, the control system and its associated electrical power output points 32 for the valves are generally located inside of the building for protection from the weather and from unauthorized tampering. The internal location typically is such that is generally inconvenient and sometimes virtually impossible to gain entry to the building to effect maintenance.

According to the present invention an accessible panel 35 (FIG. 2) is provided outside of the building at any convenient location near the manifold 20. The panel may have a hinged cover to protect against the weather. The panel includes an electrical receptacle 34 with a plurality of connectors 36, each of which is connected electrically to one of the power output points 32 associated with the clock means.

Further according to the invention a portable apparatus 38 comprising a switching unit 39 and other components is also provided. The unit includes a plug 40 or other means for detachably coupling into the receptacle 34. The plug has a plurality of second connectors 42 adapted to electrically contact corresponding first connectors 36. A multiple position selection switch 44, such as a conventional rotary switch, is mounted on the unit so as to selectively supply electrical power to the second connectors 42 and thereby through the first connectors 36 and the power points 32 to the dedicated valve solenoids 23. Thus, upon the plug 40 being coupled into the receptacle, the dedicated valves are selectively openable remotely by the switch independently of the clock system without requiring entry into the building.

Other features may be added to the apparatus 38 including master switching. In such case the receptacle 34 has an additional connector 46 that is connected electrically to the master valve 24. The plug 40 has an additional second connector 48 adapted to electrically contact the additional first connector 46. The switching unit 39 further comprises an auxiliary master switch 50, conveniently a simple toggle switch, for electively supplying electrical power to the additional second connector and thereby to the master valve solenoid 25. Upon the plug being coupled into the receptacle the master valve is openable remotely.

Power for the switching unit 39 is taken from the main power source 28, or from an auxiliary source, or advantageously through a choice of either. To derive power from the main source, the receptacle 34 has a further connector 52 connected electrically to the main source, and the power means 54 for the switching unit 39 includes the plug 40 having a further second connector 56 for electrically contacting the further first connector 52. The selective switch 44 has its common terminal 58 connected electrically to the further second connector.

In a preferred embodiment the power means 54 for the switching unit also includes an auxiliary means 60 for disconnecting the power source 28 from the switching means 44 and substituting auxiliary power to the portable switching unit. A jack switch 62 has a normally closed connection between an input contact (a) 66 and an output contact (b) 68 to normally provide a power connection between the further first connector 52 and the power source 28.

A portable battery pack 70 consists of a battery 72 and a jack plug 74 interconnected by rigid or flexible leads 75. When the jack plug is inserted into the jack switch 62 they coact so that the main power connection 64 is opened and a connection for a battery contact (b) 76 to the jack switch output contact (b) 68 is substituted. The other battery lead (c) 78 contacts a further contact (c) 80 in the jack plug that leads to the return or common ("ground") 82 for the main power 28 and the valve solenoids 23,25. The battery voltage is selected for compatibility with the main voltage; for example if the main voltage is 24 volts AC, the battery should be about 12 volts DC. Although the battery pack 70 is described here as a separate unit, it basically is part of the switching apparatus 38, and alternatively may be assembled integrally into the switching unit with an appropriate receptacle/plug combination.

A fixed master switch 84 for the master valve is desirable, for example with a key for only authorized use. Such a main switch is advantageously located in the panel 35 to electively disconnect the master valve from the clock means. In an ordinary sprinkler system the master valve 24 is activated via a communal power point 86 (P) to which power is supplied by the clock whenever the clock also supplies power for any of the dedicated valves. In some installations a pump (not shown) is activated via point P in addition to or instead of the master valve. The clock simultaneously opens the master valve (and/or activates a pump) whenever a zone valve 22 is opened, and otherwise the master valve is closed. In the present case the master valve 24 is powered by way of the master key switch 84 which is connected to the communal point 86. Thus the master valve may be inactivated in the closed position by the key switch while dedicated valves are opened for draining or other maintenance. For cooperation with the switching apparatus of the invention, the connector 46 is connected to the output 87 of the key switch.

A sprinkler system generally has a main power switch 89, and also may have a rain sensor switch 91 connected between ground 82 and the power return line 93 for the valve solenoids. Either of these will deactivate the main power from actuating the valves. In a further embodiment of the invention the switching unit 38 further includes a light bulb 88, or a sound or other signal device, electrically connected to the further second connector 56. A common return 94 from the light is effected through supplementary first and second connectors 90,92 in the receptacle and plug that lead back to the power source common (ground) 82. When the main power is on, the light will indicate accordingly. If it does not so signal, the battery pack 70 may be substituted so that the valves may be actuated.

The system also should include an override for the rain sensor 91 which may have inactivated the sprinkler system when maintenance operation is desired. To achieve this yet another set of connectors 96,98 in the receptacle and plug are provided. Connector 96 in the plug is connected conveniently to the common return 94 for the light 88. Connector 98 in the receptacle is connected to the common return 93 for the valve solenoids, in parallel with the rain sensor. When the plug is coupled, a resulting return line for the valves bypasses the rain sensor.

Thus the invention provides for full operation of the sprinkler system from an accessible location, and does not require entry into the building or other location containing the clock and associated switches and power points that normally control the system. Cost is minimized by use of a single switching unit that may be used for a large number of sprinkler installations, thus not requiring individual switches on the outside panels or costly lock boxes for the panels that would be required for security. Also the system is much cheaper than those utilizing radio control of the valves.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

I claim:

1. A maintenance control apparatus for a lawn watering system including a multiplicity of sprinklers for dispersing water onto a lawn, a plurality of water conduits receptive of pressurized water with each conduit communicating with at least one of the sprinklers, a plurality of electrically actuated dedicated valves each being disposed in one of the conduits, a plurality of electrical power points each being connected electrically to one of the dedicated valves, and internal control means communicating with an electrical power source for selectively supplying electrical power to the power points and thereby to the dedicated valves so as to selectively provide water to the sprinklers, the power points and the internal control means being disposed in an internal location so as to be generally inaccessible, wherein the apparatus comprises:

an accessibly mounted receptacle having a plurality of first connectors each being connected electrically to one of the power points, and a portable switching system comprising coupling means for detachably coupling into the receptacle and having a plurality of second connectors adapted to electrically contact corresponding first connectors, and selective switching means communicating with a power means for selectively supplying electrical power to the second connectors and thereby to the dedicated valves, whereby, with the coupling means coupled into the receptacle, the dedicated valves are selectively openable remotely by the switching means independently of the internal control means.

2. The apparatus of claim 1 wherein the receptacle has a further first connector being connected electrically to the power source, and the power means comprises the coupling means having a further second connector adapted to electrically contact the further first connector, and the switching means having a common terminal connected electrically to the further second connector.

3. The apparatus of claim 2 wherein the power means further comprises auxiliary means for detachably coupling into the power source so as to disconnect the power source from the switching means and substitute therefor auxiliary power in electrical contact with the switching means.

4. The apparatus of claim 3 wherein the auxiliary means comprises a normally closed jack switch disposed to normally provide a power connection between the further first connector and the power source, and a portable battery pack comprising a battery and a jack plug connected thereto, the jack switch and the jack plug being coactable so that with the jack plug plugged into the jack switch the power connection is opened and a substitute connection of the battery is effected.

5. The apparatus of claim 1 wherein the watering system further includes deactivation means for deactivating the power source from the watering system, and the apparatus further comprises signaling means for signaling whether the power source is deactivated, the signaling means comprising the receptacle having a supplementary first connector for being connected as a return line to the power source, the coupling means having a supplementary second connector for electrically contacting the supplementary first connector, and a light bulb disposed in the switching system and connected electrically between the supplementary first connector and the supplementary second connector.

6. The apparatus of claim 5 wherein the watering system further includes rain sensing means electrically connected to the dedicated valves so as to deactivate the dedicated valves from opening in an event of rain, and the apparatus further comprises override means for overriding the rain sensing means, the override means comprising the receptacle having a pair of extra first connectors and the plug having a pair of extra second connectors each for electrically contacting a corresponding extra first connector, and the pair of extra connectors being connected across the rain sensing means.

7. The apparatus of claim 1 wherein:

the watering system further includes manifold means for distributing water into the conduits, and an electrically actuated master flow means for electively supplying the pressurized water to the manifold means, the apparatus further comprises the receptacle having an additional first connector for being connected electrically to the master flow means, and the coupling means having an additional second connector adapted to electrically contact the additional first connector, and the switching system further comprises a portable master switch communicating with the power means for electively supplying electrical power to the additional second connector and thereby to the master flow means, whereby upon the coupling means being coupled into the receptacle the master flow means is actuatable remotely.

8. The apparatus of claim 7 further comprising a fixed master switch for mounting accessibly and connecting between the power source and the additional first connector so as to electively hold the master flow means off except when overridden by the portable master switch.

9. The apparatus of claim 8 wherein the watering system further includes a communal power point receptive of power from the internal control means whenever the internal control means also supplies power to any of the dedicated valves, and the fixed master switch has an input terminal connected to the communal power point and an output terminal connected to the master flow means.

* * * * *